United States Patent
Patel et al.

(10) Patent No.: US 7,389,360 B1
(45) Date of Patent: Jun. 17, 2008

(54) CONTEXT SWITCHED ROUTE LOOKUP KEY ENGINE

(75) Inventors: Pankaj Patel, Cupertino, CA (US); Viswesh Ananthakrishnan, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 877 days.

(21) Appl. No.: 09/985,676

(22) Filed: Nov. 5, 2001

(51) Int. Cl.
*G06F 15/173* (2006.01)

(52) U.S. Cl. .................. 709/238; 709/223; 709/224; 709/246; 370/351; 370/360; 370/395.2

(58) Field of Classification Search ........ 709/238–244, 709/246, 223, 224; 370/351, 360, 395.32
See application file for complete search history.

(56) References Cited

U.S. PATENT DOCUMENTS

| | | | | |
|---|---|---|---|---|
| 5,793,747 A * | 8/1998 | Kline | ................. | 370/230 |
| 6,032,190 A * | 2/2000 | Bremer et al. | ............... | 709/238 |
| 6,192,051 B1 * | 2/2001 | Lipman et al. | ............. | 370/389 |
| 6,452,933 B1 * | 9/2002 | Duffield et al. | ............. | 370/415 |
| 6,463,067 B1 * | 10/2002 | Hebb et al. | ................ | 370/413 |
| 6,587,463 B1 * | 7/2003 | Hebb et al. | ................ | 370/392 |
| 6,711,153 B1 * | 3/2004 | Hebb et al. | ................ | 370/351 |
| 6,798,777 B1 * | 9/2004 | Ferguson et al. | ........... | 370/392 |
| 6,917,620 B1 * | 7/2005 | Sindhu et al. | ............... | 370/401 |
| 7,116,660 B2 * | 10/2006 | Sindhu et al. | .............. | 370/389 |
| 7,125,637 B2 * | 10/2006 | Ohmura et al. | .......... | 430/110.3 |
| 7,145,913 B2 * | 12/2006 | Craig et al. | ................. | 370/401 |
| 7,243,184 B1 * | 7/2007 | Ferguson et al. | ........... | 711/100 |
| 2002/0176358 A1 * | 11/2002 | Assa et al. | .................. | 370/229 |
| 2003/0061466 A1 * | 3/2003 | Samra et al. | ............... | 712/217 |
| 2003/0101276 A1 * | 5/2003 | Park et al. | .................. | 709/238 |

OTHER PUBLICATIONS

"Thread Prioritization: A Thread Scheduling Mechanism for Multiple-Context Parallel Processors" Stuart Fiske and William J. Dally Jan. 1995.*

* cited by examiner

*Primary Examiner*—Saleh Najjar
*Assistant Examiner*—Shawki S Ismail
(74) *Attorney, Agent, or Firm*—Harrity Snyder LLP

(57) ABSTRACT

A key engine that performs route lookups for a plurality of keys may include a data processing portion configured to process one data item at a time and to request data when needed. A buffer may be configured to store a partial result from the data processing portion. A controller may be configured to load the partial result from the data processing portion into the buffer. The controller also may be configured to input another data item into the data processing portion for processing while requested data is obtained for a prior data item. A number of these key engines may be used by a routing unit to perform a large number of route lookups at the same time.

8 Claims, 9 Drawing Sheets

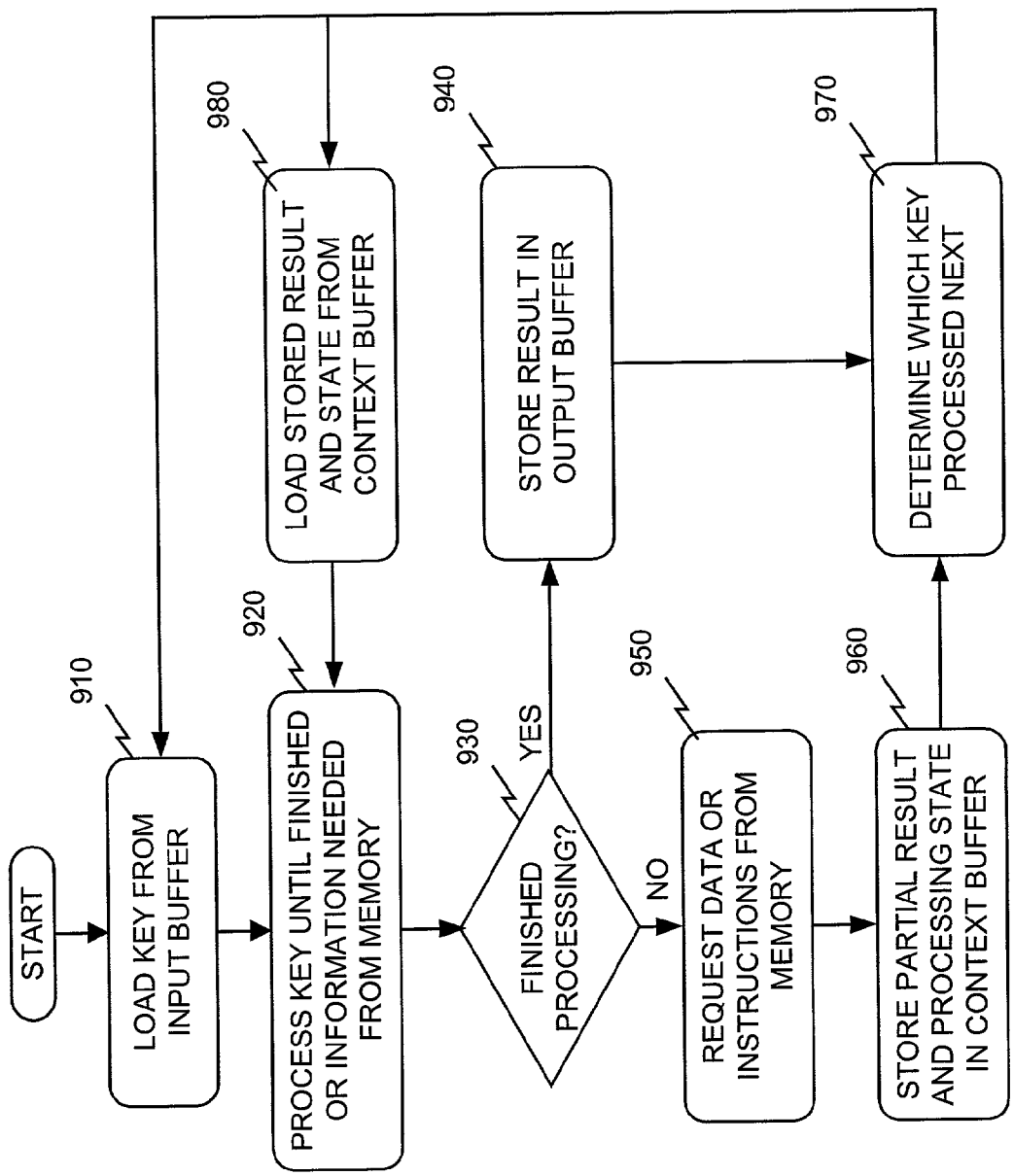

CONTEXT SWITCHED ROUTE LOOKUP KEY ENGINE

BACKGROUND OF THE INVENTION

1. Field of the Invention

The present invention relates generally to data processing and, more particularly, to systems and methods for performing route lookups for packets of information.

2. Description of Related Art

Routers receive data on a physical media, such as optical fiber, analyze the data to determine its destination, and output the data on a physical media in accordance with the destination. Routers were initially designed using a general purpose processor executing large software programs. As line rates and traffic volume increased, however, general purpose processors could not scale to meet these new demands. For example, as functionality was added to the software, such as accounting and policing functionality, these routers suffered performance degradation. In some instances, the routers failed to handle traffic at line rate when the new functionality was turned on.

To meet the new demands, purpose-built routers were designed. Purpose-built routers were planned and constructed with components optimized for routing. They not only handled higher line rates and higher network traffic volume, they also added functionality without compromising line rate performance.

A purpose-built router may include a number of input and output ports from which it transmits and receives information packets. A switching fabric or other transmission medium may be implemented in the router to carry the packets between the ports. In a high-performance purpose-built router, the switching fabric may transmit a large amount of information between a number of internal components. Typically, the information is transmitted within the router in discrete quantities, or "cells," which it generates by breaking down information packets that it receives.

These cells may be routed through the switching fabric or to certain output ports based on a route lookup that is performed by a routing unit. Although the routing units in the first purpose-built routers met the demands of the network at that time, they will not be able to meet the rising demands for bandwidth and added functionality as line rates and network traffic volume increase.

Thus, there is a need in the art to more efficiently implement route lookups within routers.

SUMMARY OF THE INVENTION

Systems and methods consistent with the principles of the invention, among other things, process multiple keys per key engine and fully utilize processing circuitry therein by context-switching keys for processing, instead of idly waiting for data and/or instructions to return from a memory.

In accordance with one purpose of the invention as embodied and broadly described herein, a method of performing route lookups for a group of data may include processing, by a processor, a first data to generate routing information until first information is needed, and requesting the first information. First context state information for the first data may be stored, and the processor may process a second data to generate routing information until second information is needed. The second information may be requested, and second context state information for the second data may be stored. Processing may resume on the first data using the stored first context state information after the requested first information is received.

In another implementation consistent with principles of the invention, a method of processing for routing packets may include processing a first data related to routing of a first packet until first information is needed, and requesting the first information. Intermediate information related to the first data may be stored, and a second data related to routing of a second packet may be processed while waiting for the requested first information to arrive.

In still another implementation consistent with principles of the invention, a method for routing packets of information using corresponding data structures may include receiving a group of data structures related to the packets of information, and sending the data structures to processing engines. Each data structure may correspond to a different packet of information. Each key processor may concurrently perform route lookups for at least two of the data structures at a time. The data structures may be modified based on the route lookups, and the packets of information may be routed based on the modified data structures.

In further implementation consistent with principles of the invention, a network device may include an input portion configured to receive data structures and to transmit data items associated with the data structures, and a group of processing engines. Each processing engine may be configured to receive a group of data items from the input portion and to contemporaneously compute routes for the data items. A resource may be configured to receive requests from the processing engines. A result processor may be configured to modify the data structures based on the routes computed by the processing engines.

In yet another implementation consistent with principles of the invention, a system for performing route lookups for a group of data items may include a data processing portion configured to process one data item at a time and to request data when needed. A buffer may be configured to store a partial result from the data processing portion. A controller may be configured to load the partial result from the data processing portion into the buffer. The controller also may be configured to input another data item into the data processing portion for processing while requested data is obtained for a prior data item.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 9 is a flow chart illustrating processing performed by the key engine in FIG. 4 according to an implementation consistent with the principles of the invention.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

As described herein, in one implementation, a key engine may concurrently process multiple keys by saving a processing state in a buffer and loading another for processing when data and/or instructions are requested from a memory. Double data rate memory may also be used to reduce latency.

System Description

Figure 1:
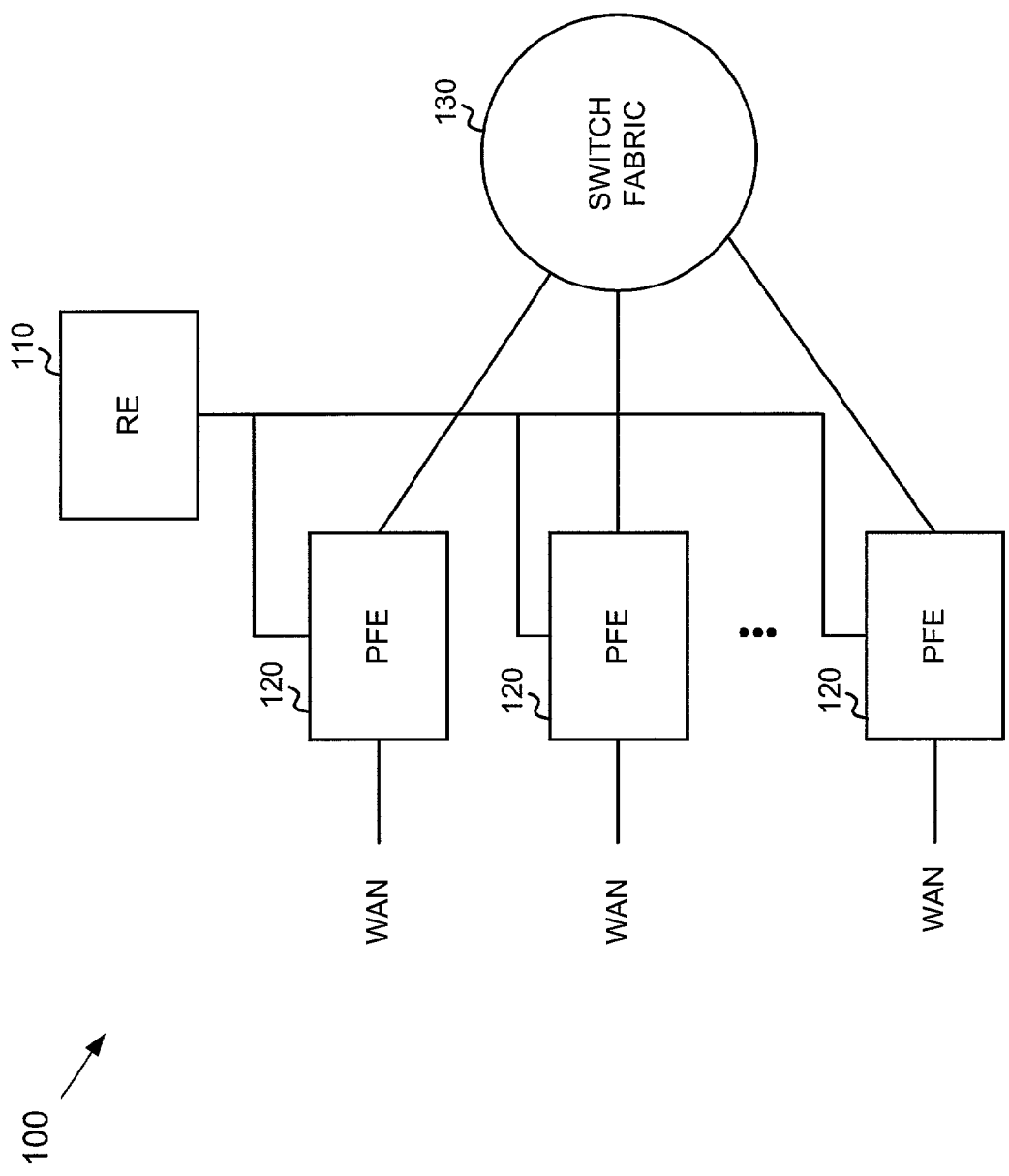
FIG. 1 is a diagram of an exemplary network device in which systems and methods consistent with the principles of invention may be implemented.

FIG. 1 is a diagram of an exemplary network device in which systems and methods consistent with the principles of the invention may be implemented. The principles of the invention will be described in terms of packets, but the principles apply to flow of any type of data unit. In this particular implementation, the network device takes the form of a router 100. The router 100 may receive one or more data streams from a physical link, process the data stream(s) to determine destination information, and transmit the data stream(s) on one or more links in accordance with the destination information.

Router 100 may include a routing engine (RE) 110 and multiple packet forwarding engines (PFEs) 120 interconnected via a switch fabric 130. Switch fabric 130 may include one or more switching planes to facilitate communication between two or more of PFEs 120. In an implementation consistent with the principles of the invention, each of the switching planes includes a three-stage switch of crossbar elements.

RE 110 may include processing logic that performs high level management functions for router 100. For example, RE 110 may communicate with other networks and systems connected to router 100 to exchange information regarding network topology. RE 110 may create routing tables based on the network topology information, create forwarding tables based on the routing tables, and forward the forwarding tables to PFEs 120. PFEs 120 may use the routing tables to perform route lookup for incoming packets. RE 110 may also perform other general control and monitoring functions for router 100.

Each of PFEs 120 connects to RE 110 and switch fabric 130. PFEs 120 receive data on physical links connected to a network, such as a wide area network (WAN). Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet.

Figure 2:
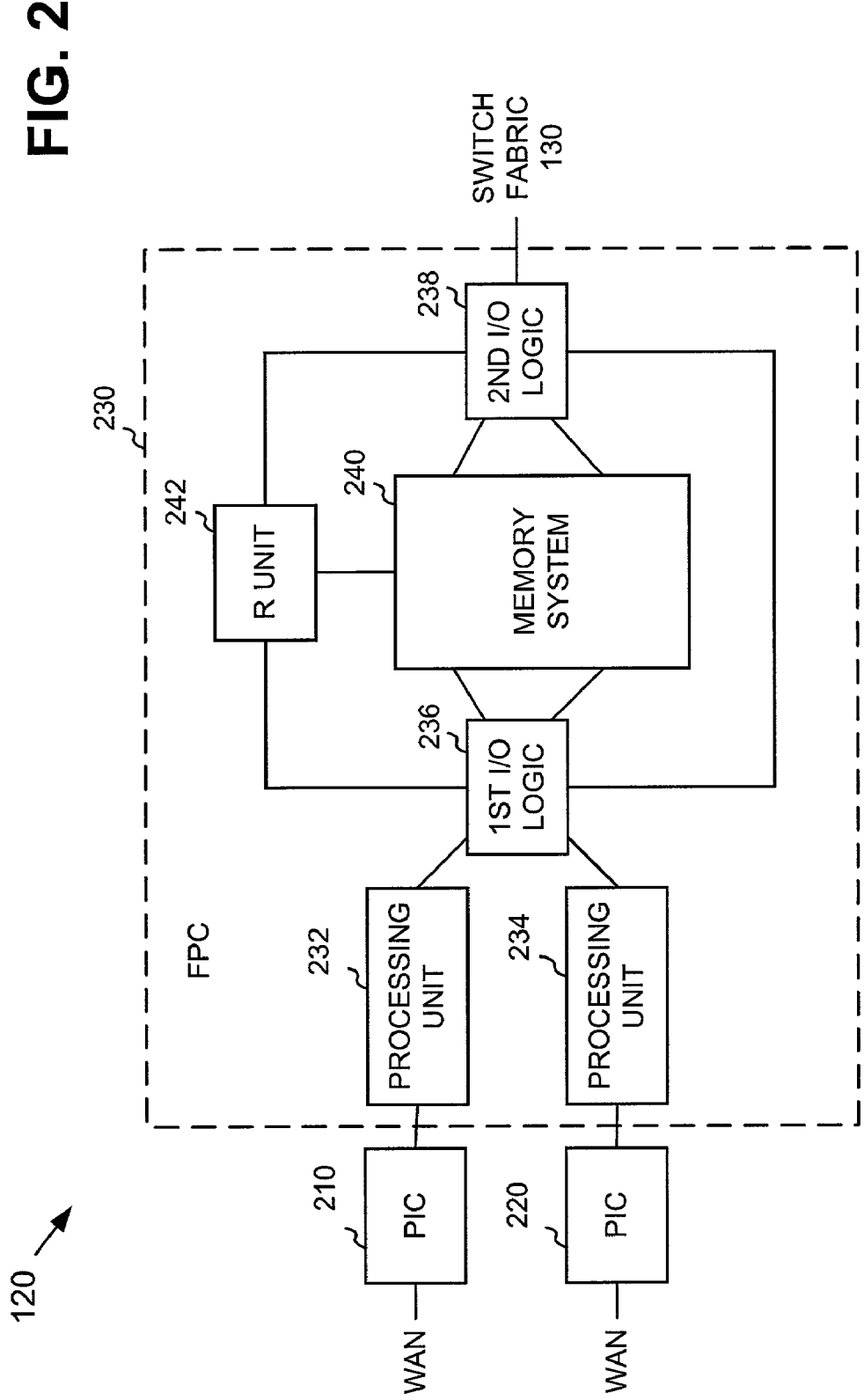
FIG. 2 is an exemplary diagram of a packet forwarding engine (PFE) of FIG. 1 according to an implementation consistent with the principles of invention.

FIG. 2 is an exemplary diagram of a PFE 120 according to an implementation consistent with the present invention. PFE 120 may include physical interface cards (PICs) 210 and 220 connected to a flexible port concentrator (FPC) 230. While two PICs 210 and 220 are shown in FIG. 2, there may be more or fewer PICs in other implementations consistent with the principles of the invention.

PICs 210 and 220 connect to WAN physical links and FPC 230 and transport data between the WAN and FPC 230. Each of PICs 210 and 220 includes interfacing, processing, and memory elements necessary to transmit data between a WAN physical link and FPC 230. Each of PICs 210 and 220 may be designed to handle a particular type of physical link. For example, a particular PIC may be provided to handle only Ethernet communications.

For incoming data, PICs 210 and 220 may strip off the layer 1 (L1) protocol information and forward the remaining data (raw packets) to FPC 230. For outgoing data, the PICs 210 and 220 may receive packets from FPC 230, encapsulate the packets in L1 protocol information, and transmit the data on the physical WAN link.

FPC 230 performs packet transfers between PICs 210 and 220 and switch fabric 130. For each packet it handles, FPC 230 may perform route lookup based on packet header information to determine destination information and send the packet either to PIC 210 and 220 or switch fabric 130, depending on the destination information.

FPC 230 may include processing units 232 and 234, first input/output (I/O) logic 236, second I/O logic 238, memory system 240, and a routing (R) unit 242. Each of processing units 232 and 234 corresponds to one of PICs 210 and 220. Processing units 232 and 234 may process packet data flowing between PICs 210 and 220, respectively, and first I/O logic 236. Each of processing units 232 and 234 may operate in two modes: a first mode for processing packet data received from PIC 210 or 220 connected to it, and a second mode for processing packet data received from first I/O logic 236.

In the first mode, processing unit 232 or 234 may process packets from PIC 210 or 220, respectively, convert the packets into "cells," and transmit the cells to first I/O logic 236. Cells are the data structure used internally by FPC 230 for transporting and storing data. In one implementation, cells are 64 bytes in length.

Packets received by processing unit 232 or 234 may include two portions: a header portion and a packet data portion. For each packet, processing unit 232 or 234 may process the header and insert the header and processing results into the cells. For example, processing unit 232 or 234 may parse layer 2 (L2) and layer 3 (L3) headers of incoming packets. Processing unit 232 or 234 may also create control information based on the packet. The control information may be based on the packet header, the packet data, or both. Processing unit 232 or 234 may then store the parsed headers, control information, and the packet data in cells, which it sends to first I/O logic 236.

In the second mode, processing unit 232 or 234 handles data flow in the opposite direction to the first mode. In the second mode, processing unit 232 or 234 receives cells from first I/O logic 236, extracts the header information, control information, and packet data from the cells, and creates a packet based on the extracted information. Processing unit 232 or 234 creates the packet header from the header information and possibly the control information from the cells. In one implementation, processing unit 232 or 234 creates L2 and L3 header information based on the header information and control information. Processing unit 232 or 234 may load the packet data portion with the packet data from the cells.

First I/O logic 236 and second I/O logic 238 coordinate data transfers into and out of FPC 230. First I/O logic 236 and second I/O logic 238 also create data structures called "notifications" based on L2/L3 header information and control information in the cells. While first I/O logic 236 and second I/O logic 238 are shown as separate units, they may be implemented as a single unit in other implementations consistent with principles of the invention.

Memory system 240 may temporarily store cells from first I/O logic 236 and second I/O logic 238, as well as notifications from R unit 242.

R unit 242 receives notifications from first I/O logic 236 and second I/O logic 238. R unit 242 may include processing logic that provides route lookup, accounting, and policing functionality. R unit 242 may receive one or more routing tables from RE 110 (FIG. 1) and use the routing table(s) to perform route lookups based on the notifications. R unit 242 may insert the lookup result into the notification, which it forwards to memory system 240.

R Unit Description

Figure 3:
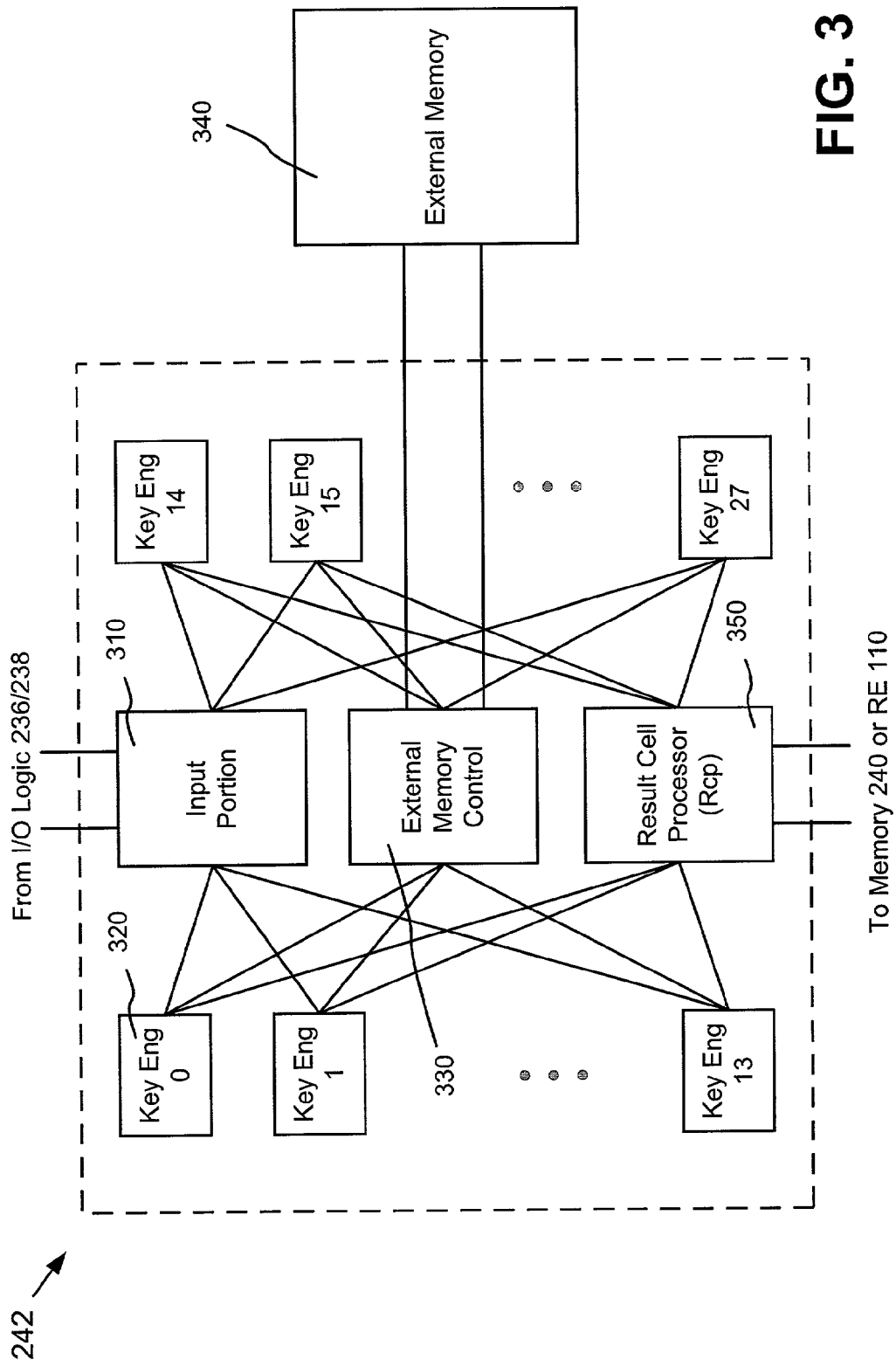
FIG. 3 is a detailed block diagram illustrating portions of the routing unit shown in FIG. 2 according to an implementation consistent with the principles of invention.

FIG. 3 shows an embodiment of R unit 242 consistent with the principles of the invention. R unit 242 provides route lookup, encapsulation lookup, and filtering for cells coming from first I/O logic 236 and second I/O logic 238. For an incoming packet from either I/O logic 236/238, R unit 242 receives a notification, which includes a "key" that contains L2/L3 header information. R unit 242 uses the key and the other contents of the notification to perform filtering and route lookup. Based on the filtering and route lookup, R unit 242 may modify the notification and forward the notification to memory system 240 or to RE 110. R unit 242 may also perform other types of processing. For example, R unit 242 might perform policing, such as L3 policing, sampling, multi-protocol label switching (MPLS), multi-casting, and accounting support.

R unit 242 may include an input portion 310, a number of key engines 320, an external memory control 330, and a result cell processor (Rcp) 350. An external memory 340 may be connected to external memory control 330.

Input portion 310 processes keys and notifications from first I/O logic 236 and second I/O logic 238. Input portion 310 may include a buffer (not shown) for storing keys and associated notifications. Input portion 310 may also include logic to distribute the received keys among key engines 320. In this manner, multiple keys may be simultaneously processed by key engines 320.

Key engines 320 may be connected to input portion 310, external memory control 330, and to Rcp 350. Key engines 320 may be configured to receive keys from input portion 310, and to perform route lookups for the keys in conjunction with external memory control 330 and external memory 340. Key engines 320 may store result data from the key processing in result buffers for transfer to Rcp 350. Key engines 320 may use internal memory (not shown) for storing results and other processing-related data. Such results may include, for example, one or more next hops for the packet of information associated with the processed key. In one implementation consistent with the principles of the invention, there may be 28 key engines 320 in R unit 242. Each key engine 320 may run multiple processes for processing keys. Key engines 320 will be described in greater detail with respect to FIG. 4 below.

External memory control 330 may be connected to key engines 320 and external memory 340. External memory control 330 may receive access requests for instructions from key engines 320. In one embodiment, access requests are received in a round-robin fashion. External memory control 330 may pipeline requests from key engines 320 to external memory 340 to fully utilize the bandwidth of external memory 340. External memory control 330 may also perform accounting, filtering, and policing functions for the key lookups.

External memory 340 may be connected to external memory control 330 and may be configured to store microcode instructions for processing the keys or other key-related information, such as forwarding tables and encapsulation tables. In one implementation consistent with principles of the invention, external memory 330 may include 16 megabytes of double data rate synchronous random access memory (DDR SRAM). Such DDR SRAM may transfer data on both the rising and falling edges of an applied clock signal, effectively having a bandwidth of twice that of the clock signal. In one embodiment consistent with the invention, external memory may operate at 312 MHz, allowing R unit 242 to perform a route lookup for 80 million packets per second.

Rcp 350 may be connected to key engines 320. Rcp 350 may read result data from the result buffers for key engines 320, and modify the notifications from first I/O logic 236 and second I/O logic 238. In one embodiment, Rcp 350 services the result buffers for key engines 320 in a round-robin fashion. Rcp 350 may send the modified notifications to memory system 240 or to RE 110.

Key Engine Description

Figure 4:
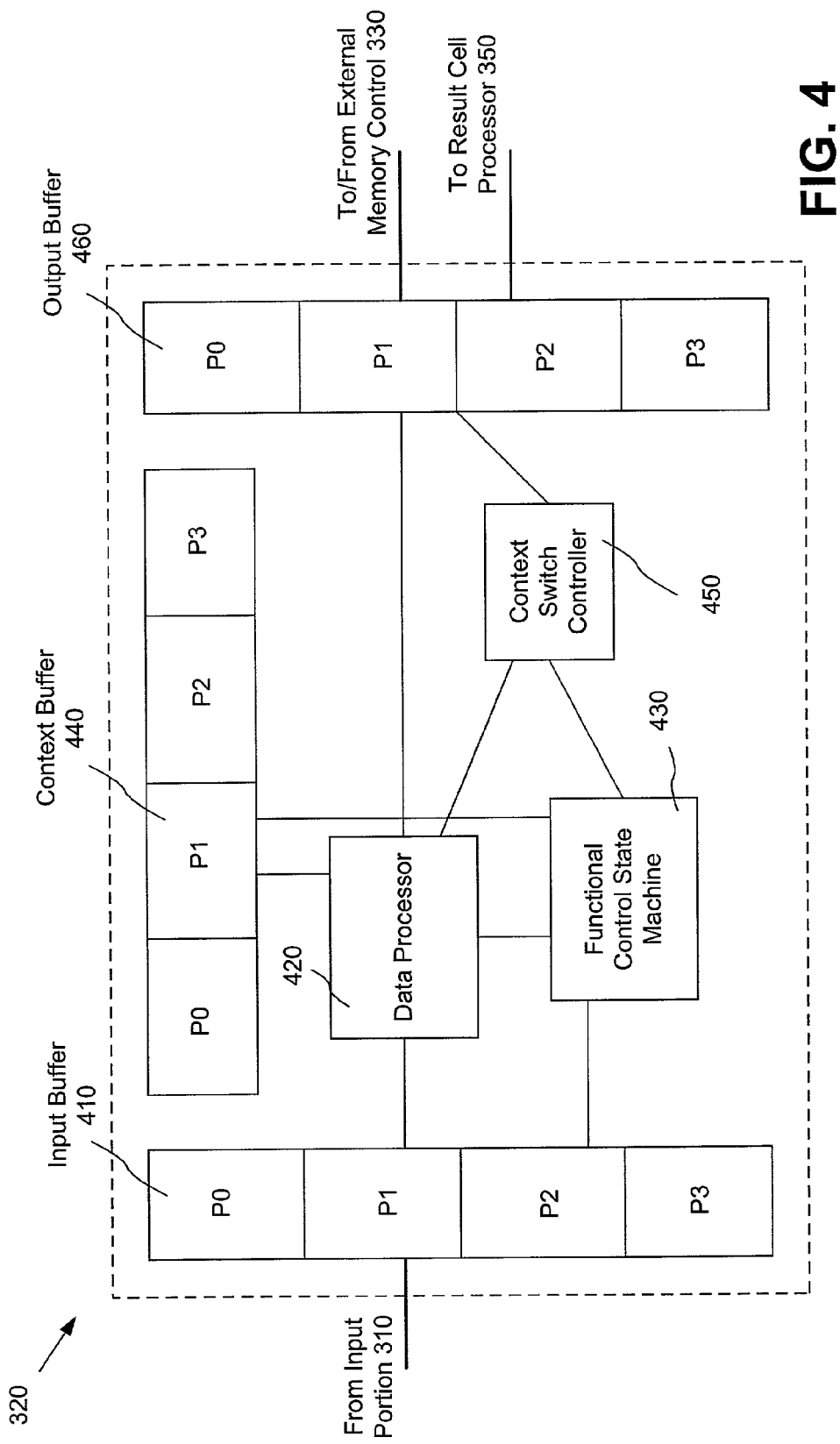
FIG. 4 is a detailed block diagram illustrating portions of the key engines shown in FIG. 3 according to an implementation consistent with the principles of invention.

FIG. 4 is a detailed block diagram illustrating portions of key engines 320 according to an implementation consistent with the principles of the invention. Each key engine 320 may perform table lookup, filtering, and route lookup. In one embodiment, use of external memory 340 and external memory control 330 are optimized by, for example, processing multiple keys within key engine 320. Internal memory (not shown) may also be used by the elements of FIG. 4. The number of keys concurrently processed by key engine 320 may be determined based on a ratio of a latency of memory 340 to an average time for processing a key. In the embodiment shown in FIG. 4, four keys may be concurrently processed using context switching.

Key engine 320 may include an input buffer 410, a data processor 420, a functional control state machine 430, a context buffer 440, a context switch controller 450, and an output buffer 460. Input buffer 410 may include a single segmented buffer or four separate buffers configured to store four keys and other data associated with four route lookup processes P0-P3.

Data processor 420 may be configured to process one key at a time using microcode instructions stored in memory 340. Data processor 420 may generate read addresses for memory 340 to access key-related information, such as forwarding tables and encapsulation tables, and use the information to compute parameters used in modifying the notification corresponding to the key being processed. During such processing (e.g., P0), data processor 420 may periodically read instructions or other data from memory 340 via external memory control 330. As will be described below, at that time, data processor 420 may be configured to request the data via output buffer 460, save any context state, such as partial results, in context buffer 440, and begin processing another key under control of context switch controller 450.

Functional control state machine 430 tracks an internal state of data processor 420 and provides such information to context switch controller 450. Functional control state machine 430 may be configured to inform context switch controller 450 that data processor 420 is about to request data from memory 340. Functional control state machine 430 also may be configured to store a state of the current process (e.g., P0) in context buffer 440 when data processor 420 requests data from memory 340.

Context buffer 440 may be configured to store context states, such as partial results, from data processor 420 and process states from functional state control machine 430 for four processes P0-P3. Because context states, such as partial results and process states, are stored in context buffer 440 during a data request for a process (e.g., P0), data processor 420 may continue processing another process (e.g., P1, P2) while P0 process would otherwise be idle. This storing of partial results and process states so that processing by data processor 420 may continue is called "context switching." Context switching effectively pipelines data requests from data processor 420, and avoids idle time for processor 420.

Context switch controller 450 may be configured to receive information from functional control state machine 430 that data processor 420 is about to request data from memory 340. In response to such information, context switch controller 450 may instruct data processor 420 to store a partial results and functional state control machine 430 to store a process states in context buffer 440. Context switch controller 450 also may be configured to load data processor 420 and context buffer with either a partial result and state from context buffer 440, or a new key from input buffer 410. In the first case, when data processor 420 resumes processing a stored process (i.e., a previously stored partial results), context switch controller 450 may also direct, for example, output buffer 460 to provide data returned from memory 340. Alternately, input buffer 410 may temporarily store the data returned from memory 340. Context switch controller 450 may include a first-in, first-out (FIFO) buffer (not shown) to determine what process (P0-P3) to load into data processor 420 and state machine 430 next.

Although the system of FIG. 4 has been described in terms of context switching while waiting for memory access request results, context switching may also be performed while additionally or alternatively waiting for other types of request results, such as processing request results.

Figure 5:
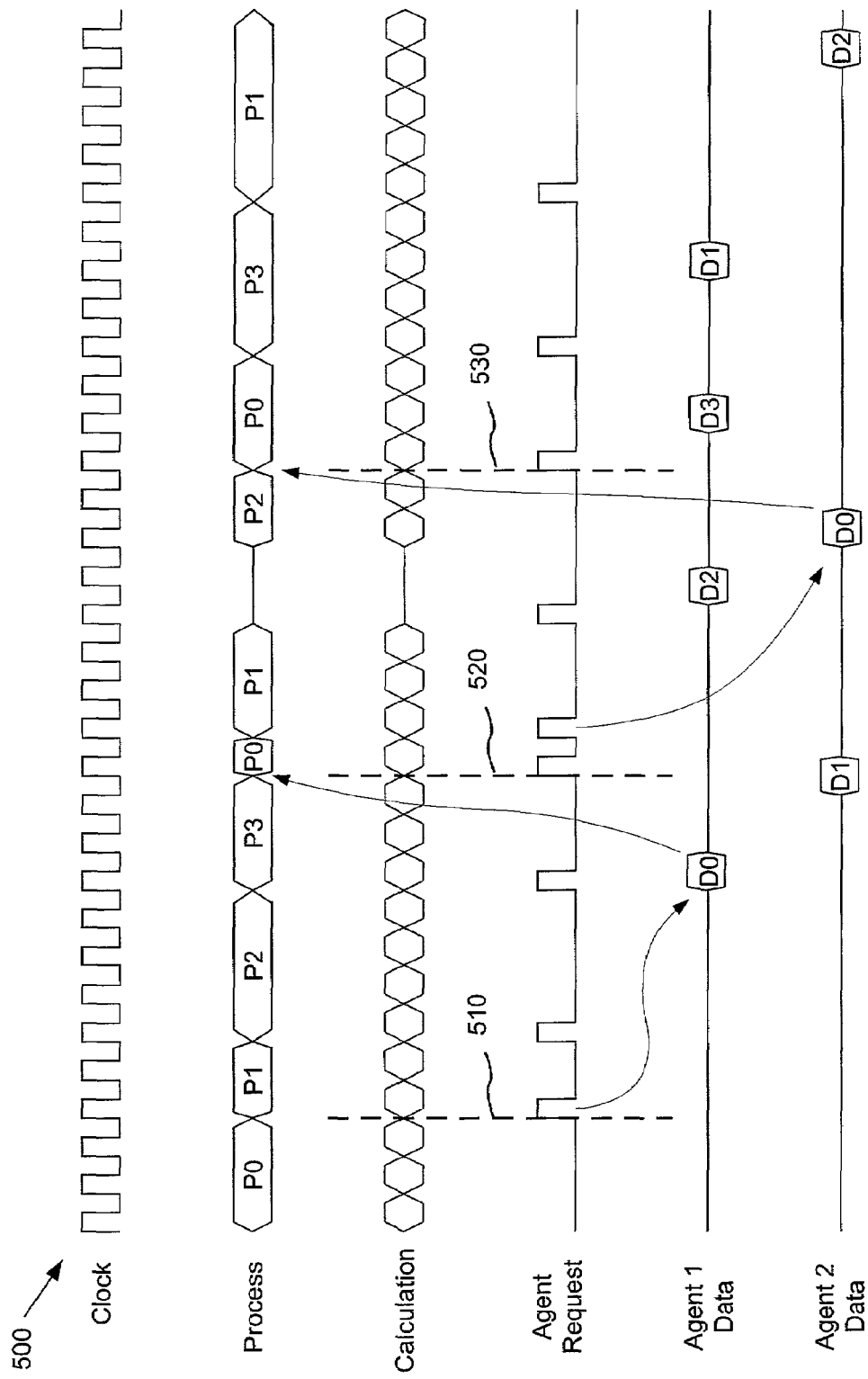
FIG. 5 is an exemplary timing diagram illustrating the context switching performed by the key engine of FIG. 4 according to an implementation consistent with the principles of invention.

FIG. 5 is an exemplary timing diagram 500 illustrating the context switching performed by key engine 320 according to an implementation consistent with the principles of the invention. The Clock signal may be common to and used by all elements in R unit 242, including key engine 320. The Process signal denotes which process (i.e., which key is being processed) is currently being performed by data processor 420. As illustrated in diagram 500, processes may perform one, two, or more calculations before needing data. In practice, different keys may be associated with different types of lookup processes.

The Calculation signal denotes various calculations performed by processes P0, P1, etc. The number of calculations performed by each process before needing data may vary in practice. For example, process P0 may perform three calculations before needing data or an instruction from external memory 340, while process P1 may perform only two calculations before a data or instruction request. In practice, the average number of calculations performed before needing data from memory 340 may be about three, but may range above or below this number. At time 510, data processor 420 and functional control state machine 430 respectively store a partial result and a state for process P0 in context buffer 440.

Data processor 420 may also make a request of memory 340 at this time. Memory 340 is one example of an "agent" from which data processor 420 may request information. Such requests are illustrated as the Agent Request signal. As may be seen in FIG. 5, multiple processes P0-P3 may make requests of multiple agents (e.g., Agents 1 and 2). Also at time 510, context switch controller 450 may cause a key and state for process P1 to be loaded from input buffer 410 into data processor 420 and functional control state machine 430. Processor 420 then performs calculations for process P1, as shown in diagram 500.

The above-described context-switching continues for processes P2 and P3. At time 520, process P3 may need data or instructions, and may make an Agent Request. By time 520, data D0 requested by data processor 420 for process P0 at time 510 may be available, as shown on the Agent 1 Data signal. At time 520, context switch controller 450 may cause a key and state for process P0 to be reloaded from context buffer 440 into data processor 420 and functional control state machine 430, along with data D0. Data processor 420 may resume performing calculation for process P0, performing one calculation for example, before again requesting data from an agent. When data processor 420 for process P0 again requests data, the earlier-requested data D1 for process P1 may be available, and data processor 420 may perform, for example, three calculations for process P1.

When there are multiple agents, data may arrive faster from one agent than from another agent. For example, in FIG. 5, the second-requested D0 arrives from Agent 2 before the first-requested D3 arrives from Agent 1. Hence, process P0 may resume before process P3 (i.e., in a different order than the order in which they made the requests), because the data D0 for P0 arrives first and is available when process P2 halts at time 530.

Between times 520 and 530, processes P0-P2 may again be context-switched to and from context buffer 440. Such context-switching allows four keys to be concurrently processed by data processor 420, thereby more fully utilizing data processor 420 (see mostly utilized Calculation signal in FIG. 5). By pipelining data requests to external memory 340 and any other agents (see Agent Request signal), external memory 340 and any other agents are also more fully utilized.

It should be recognized that FIG. 5 is explanatory, and not limitative of the present invention. Details and timing conventions not explicitly discussed with respect to FIG. 5 will be apparent to those skilled in the pipeline processing art. For example, in one implementation the data requested by a process (e.g., D0 requested by P0) must arrive before processor 420 resumes that process. Also, the processor 420 may perform no calculations for one or more clock cycles if all processes are awaiting data or instructions from the memory 340 (see delay before second P2 processing in FIG. 5).

System Operation

Figure 6:
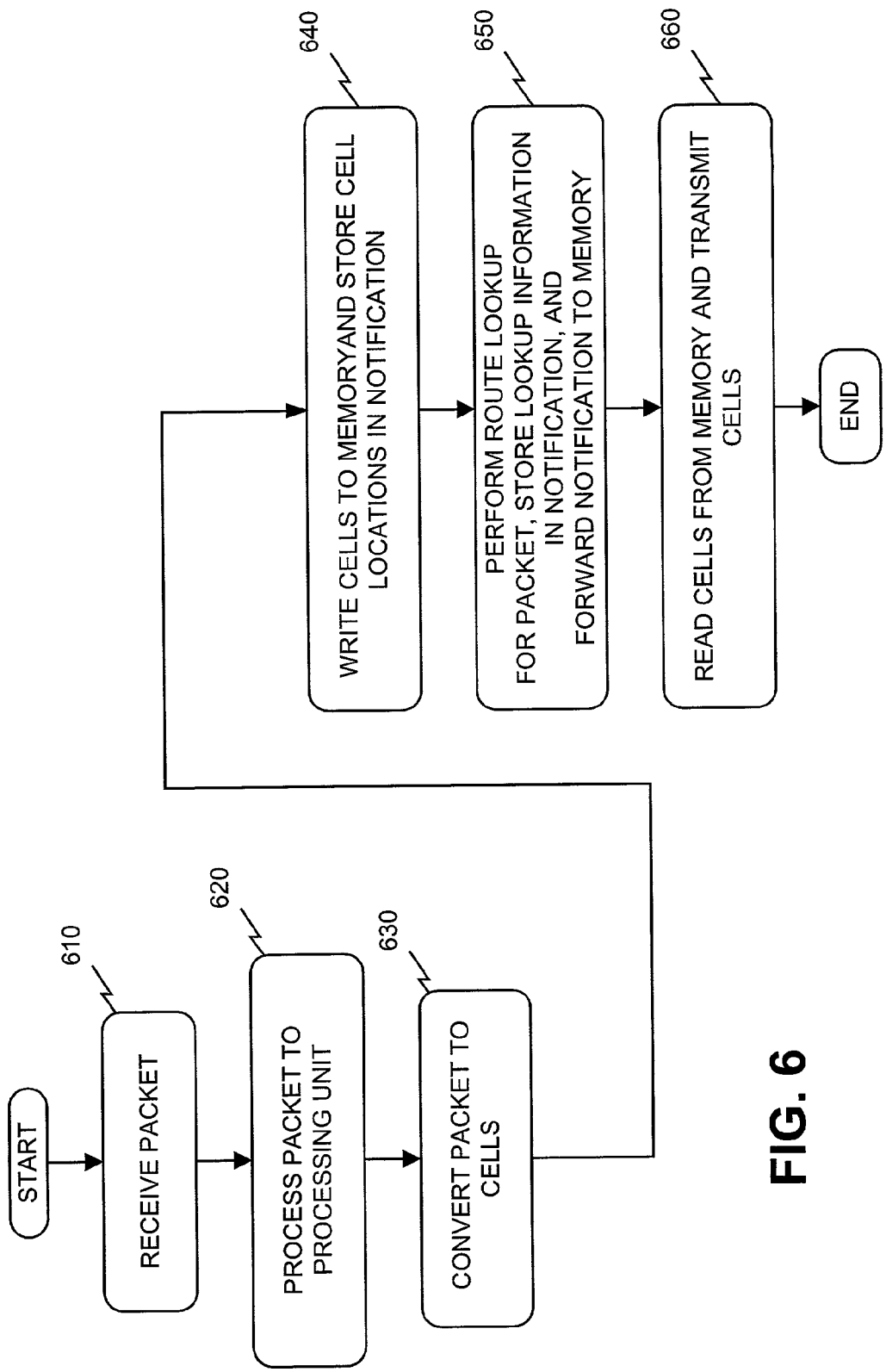
FIGS. 6 and 7 are flowcharts of exemplary processing of a packet by the network device of FIG. 1 according to an implementation consistent with the principles of invention.
Figure 7:
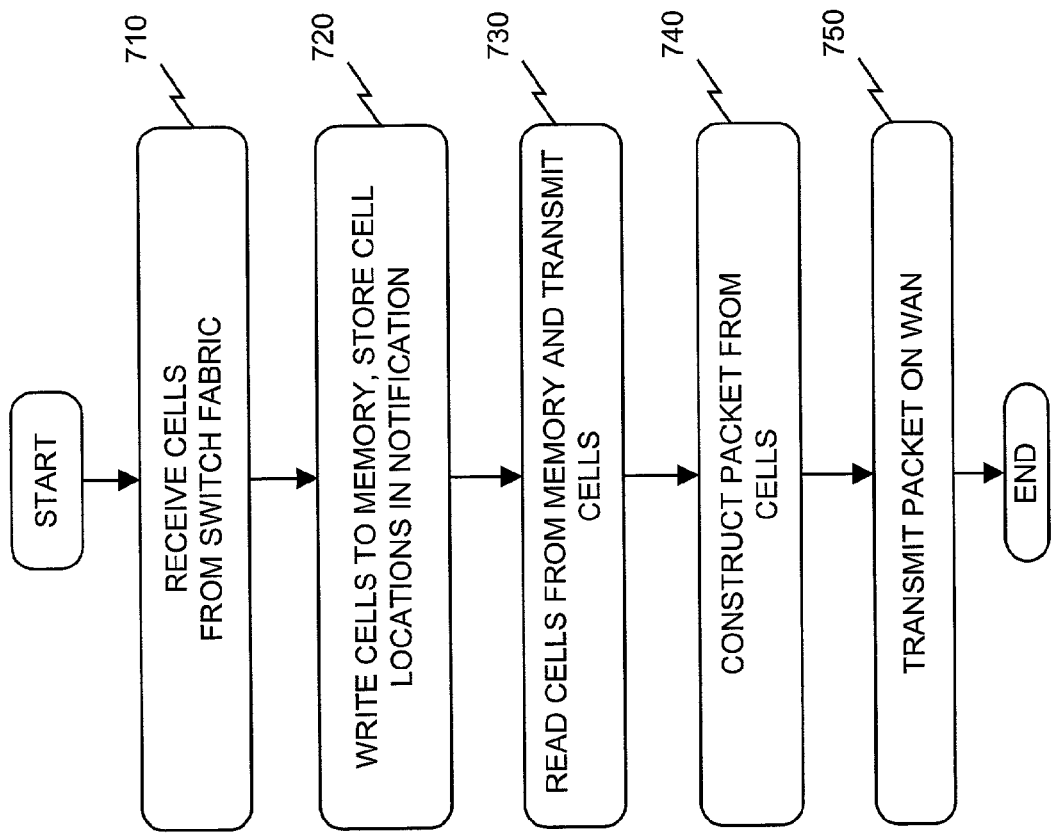

FIGS. 6 and 7 are flowcharts of exemplary processing of a packet, according to an implementation consistent with principles of the invention. Processing may begin with a network device 100 of FIG. 1, receiving a packet over a transmission medium, such as a WAN [act 610]. The packet may be one of several packets in a stream of packets transmitted between a source and a destination. Network device 100 may process the packet [act 620]. For example, network device 100 may strip the layer 1 (L1) protocol information from the packet.

Processing unit 232 or 234 may convert the packet into cells [act 630]. For example, the data of the packet may be divided into units of fixed size, such as 64 bytes, for storing in the cells. Processing unit 232 may also process the header of the packet, such as the layer 2 (L2) and layer 3 (L3) headers, and store L2 and L3 header information and the processing results in the cells. Further, processing unit 232 might create control information based on the packet. Processing unit 232 may also store the control information in the cells that it sends to first I/O logic 236.

First I/O Logic 236 may write the cells containing packet data into memory 240 [act 640]. First I/O logic 236 may store the cells in non-contiguous locations. Their location may be identified as a function of their relationship (offset) to the location of the previously stored cell in the memory 240. The address offsets may be stored in a notification [act 640]. If there are more address offsets than will fit in the notification, these additional offsets may be stored in an address cell memory.

R unit 242 may perform route lookup for the packet based on routing table(s) [act 650]. For example, R unit 242 may analyze the routing table(s) using information in the notification to identify a PIC from which the packet is to be transmitted. R unit 242 may store lookup information based on the route lookup in the notification [act 650]. The notification may then be forwarded to memory [act 650].

Returning to the system of FIG. 1, assume, for example, that the packet is received by a PIC connected to a first PFE 120 and is intended for a PIC of another PFE 120. In this case, second I/O logic 238 reads the cells and notification from memory system 240 and transmits them to switch fabric 130. Second I/O logic 238 may use data cell addresses 440 (FIG. 4) in the notification to read the cells from memory system 240. Switch fabric 130 transmits the cells and the notification to another PFE 120 (hereinafter "receiving PFE").

FIG. 7 illustrates a process of receiving cells from a switch fabric, such as switch fabric 130. The data cells are received from switch fabric 130 [act 710] (FIG. 7). The cells are written to memory. The cells may be stored in non-contiguous locations in the memory. The addresses of the cells as a function of their relationship (offset) to the memory location of the previously stored cell for the packet. The address offsets may be stored in the notification [act 720].

The cells are later read from the memory and transmitted [act 730]. The data cell addresses in the notification may be used to read the cells from the memory. Updated notification information may be stored in the cells.

A packet may then be constructed from the cells and the notification [act 740]. For example, in the system illustrated in FIG. 2, processing unit 234 may extract the notification, control information, and packet data from the cells and create a packet therefrom. Processing unit 234 may construct a packet header, such as L2 and/or L3 headers, from the notification and control information and load the packet data portion with the packet data in the cells.

The packet may then be transmitted on a transmission medium, such as a WAN [act 750]. The packet may also be encapsulated in L1 protocol information before sending the packet out on the WAN.

R Unit Operation

Figure 8:
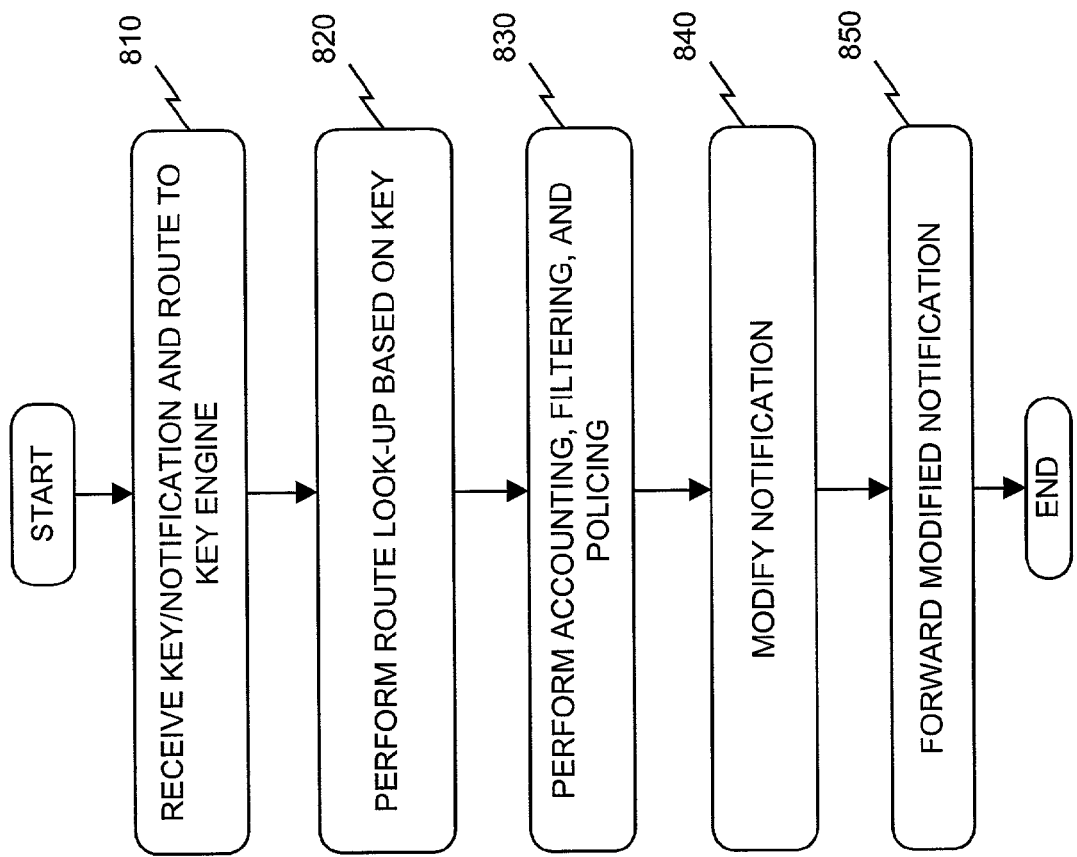
FIG. 8 is a flow chart illustrating processing performed by the routing unit in FIG. 3 according to an implementation consistent with the principles of the invention.

FIG. 8 is a flow chart illustrating processing performed by R unit 242 according to an implementation consistent with the principles of the invention. Processing may begin with input portion 310 receiving a notification from first I/O unit 236 or second I/O unit 238 and sending a key from the notification to one of key engines 320 [act 810]. Key engine 320 performs route or encapsulation lookup based on the key [act 820]. In conjunction with the route lookup, external memory control 330 may perform accounting, filtering, and policing operations based on the key and the lookup operation [act 830]. Using the results of these operations, result cell processor 350 may modify the notification [act 840] and forward the modified notification to memory 240 or RE 110 [act 850]. Although the acts of FIG. 8 are illustrated sequentially, non-dependent acts can be performed in parallel and in a different order. Additionally, other acts described in reference to FIGS. 6 and 7 may also be performed in parallel to the acts described in reference to FIG. 8 and in a different order where dependencies between the acts allow.

Key Engine Operation

FIG. 9 is a flow chart illustrating processing performed by key engine 320 according to an implementation consistent with the principles of the invention. Processing may begin with data processor 420 receiving a key to process and with state machine 430 receiving an initial state from input buffer 410 [act 910]. Data processor 420 may process the key until it is either finished processing or needs data or an instruction from memory 340 [act 920].

If data processor 420 finishes processing the key [act 930], it may store the result associated with key in output buffer 460 [act 940]. If, however, data processor 420 is not finished processing the key (i.e., it needs data or an instruction from memory 340) [act 930], data processor 420 may request such data or instructions from memory 340 [act 950].

At this time, under control of context switch controller 450, the current key may be context switched and its partial result and processing state may be stored in context buffer 440 [act 960]. When either the result is stored in output buffer [act 940] or the current key is context switched to context buffer 440 [act 960], context switch controller 450 may determine which key is to be processed next [act 970]. Context switch controller 450 may use a FIFO buffer to make such a determination. If data has been returned from memory 340 and an existing key's process is to be resumed, data processor 420 may load a stored partial result and state machine 430 may load a stored state from context buffer 440 [act 980]. Processing of the existing key may continue as shown in acts 920, 930, etc.

However, if context switch controller 450 determines that processor 420 should start with a new key, data processor 420 may receive the new key and state machine 430 may receive an initial state from input buffer 410 [act 910]. Processing of the new key may continue as shown in acts 920, 930, etc. In this manner, key engine 320 may process several keys concurrently, thereby keeping data processor 420 busy through the use of context switching.

Although described in the context of a purpose-built router, concepts consistent with the principles of the invention can be implemented in any system that requires high performance data item processing. Apparatus, systems, and methods based on the principles of the routing unit or key engines described herein may be used in any environment for processing data items associated with an entity. The data items are processed using context switching for the entities. Entities may include sources of data items, as described herein, or other entities, such as destinations, processing threads, or any other entity having individual data items that must be processed.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, although the present invention has been described with four concurrent processes per key engine, fewer or more keys may be processed per key engine. For example, from two to ten or more keys may be concurrently processed by a single key engine using context switching in accordance with the principles of the invention. The number of concurrent key processes per key engine may depend on a ratio of memory latency time to an average processing time between memory access requests.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method for routing packets received at a network device, the method comprising:
    converting the packets into a plurality of data structures;
    forwarding, using forwarding logic of the network device, the data structures to a plurality of processing engines of the network device;
    processing, by one of the processing engines, a first data structure relating to one of the packets;
    halting the processing of the first data structure when first processing information is needed to continue the processing of the first data structure and initiating processing of a second data structure;
    halting the processing of the second data structure when either second processing information is needed to continue the processing of the second data structure or the first processing information is obtained by the one processing engine;
    monitoring, by a monitor of the network device, a processing state of the one processing engine to identify partial processing results based on the halted processing of the first data structure in advance of the identified need for the first processing information;
    performing, at the one processing engine, a route lookup for the first data structure using the partial processing results;
    modifying, at the one processing engine, the first data structure based on the route lookup;
    routing, using a switch fabric of the network device, the one packet based on the modified data structure; and
    wherein said performing the route lookup includes:
        performing, at each processing engine, concurrent route lookups for up to four different data structures.

2. The method of claim 1, further comprising:
    requesting, by the one processing engine, the first processing information from one or more agents associated with the one processing engine, wherein a prospect of the requesting causes the halting of the processing.

3. The method of claim 1, further comprising:
    conducting accounting, filtering, or policing functions on the first data structure during said performing the route lookup.

4. A system for performing concurrent route lookups for processing a plurality of data items associated with routing a packet received at a network device, comprising:
    forwarding, using forwarding logic of the network device, the data items to a plurality of processing engines of a network device;
    a data processing portion that processes one of the data items and submits a data requests to a memory that stores information needed for the processing, wherein the data request halts the processing of the one data item and initiates the processing of another one of the data items;
    a control state portion that monitors operation of the data processing portion by receiving state information related to a partial processing result produced from the halted processing of the one data item by the data processing portion based on a prospective request for the stored information;
    a buffer that stores the partial processing result; and
    a controller that loads the partial processing result from the data processing portion into the buffer and inputs the other data item into the data processing portion for processing while the requested data is obtained for the one data item, wherein the data processing portion resumes the processing of the one data item in an order that differs from an order in which the processing of the one data item was halted;
    performing, at a processing engine, a route lookup for the data item using the partial processing results;
    modifying, at the one processing engine, the data item based on the route lookup;
    routing, using a switch fabric of the network device, the one packet based on the modified data items; and
    wherein said performing the route lookup includes:
        performing, at each processing engine, concurrent route lookups for up to four different data items.

5. The system of claim 4, further comprising:
    an output buffer that stores a completely processed data item from the data processing portion.

6. The system of claim 4, further comprising:
    an input buffer that stores a plurality of data items to be processed by the data processing portion.

7. The system of claim 4, wherein the data processing portion includes:
    a data processor that determines a route associated with the one data item; and wherein the control state portion includes:
    a state machine that interacts with the data processing portion to inform the controller when the data processing portion will be requesting data from the memory.

8. A system for routing packets received at a network device, the system comprising:
    converting the packets into a plurality of data structures;
    forwarding, using forwarding logic of the network device, the data structures to a plurality of processing engines of the network device;
    means for processing data structures and requesting information from an external source when the information is projected to be needed to accomplish the processing of the data structures, wherein the requesting suspends a processing of one of the data structures to form partial processing results and initiates a processing of another one of the data structures;

means for monitoring operation of the means for processing via state information associated with the partial processing results produced by the means for processing;

means for storing the partial processing results from the means for processing at least until such time as the requested information becomes available to the means for processing; and means for loading the partial processing results into the means for storing and loading the other data structure into the means for processing upon the suspension of the processing of the one data structure, loading the partial processing results into the means for processing after the requested information becomes available, and resuming the processing of the one data structure;

performing, at a processing engine, a route lookup for the data structure using the partial processing results;

modifying, at the one processing engine, the data structure based on the route lookup;

routing, using a switch fabric of the network device, the one packet based on the modified data structure; and wherein said Performing the route lookup includes:

performing, at each processing engine, concurrent route lookups for up to four different data structures.

* * * * *

UNITED STATES PATENT AND TRADEMARK OFFICE
CERTIFICATE OF CORRECTION

| | | |
|---|---|---|
| PATENT NO. | : 7,389,360 B1 | Page 1 of 1 |
| APPLICATION NO. | : 09/985676 | |
| DATED | : June 17, 2008 | |
| INVENTOR(S) | : Pankaj Patel et al. | |

It is certified that error appears in the above-identified patent and that said Letters Patent is hereby corrected as shown below:

Claim 4, column 12, line 12, "requests" should be changed to --request--.

Claim 8, column 14, line 9, "Performing" should be --performing--.

Signed and Sealed this

Fifth Day of August, 2008

JON W. DUDAS
*Director of the United States Patent and Trademark Office*